United States Patent [19]
Smith

[11] 3,757,957
[45] Sept. 11, 1973

[54] EXTENDED FILTER BAG
[75] Inventor: Edward A. Smith, Glenville, Conn.
[73] Assignee: GAF Corporation, New York, N.Y.
[22] Filed: Nov. 19, 1971
[21] Appl. No.: 200,331

[52] U.S. Cl.................. 210/486, 55/364, 210/497
[51] Int. Cl............................................ B01d 29/16
[58] Field of Search................. 55/364, 372, 368, 55/379, 380, 381, 382, 500; 210/331, 346, 356, 483, 484, 486, 487

[56] References Cited
UNITED STATES PATENTS

| | | | |
|---|---|---|---|
| 3,679,061 | 7/1972 | Davis | 210/486 |
| 3,498,031 | 3/1970 | Fesco | 55/368 |
| 3,295,687 | 1/1967 | Schmerler | 210/486 |
| 3,263,819 | 8/1966 | Schmidt et al. | 210/486 |
| 2,607,436 | 8/1952 | Martin | 55/381 X |
| 1,381,944 | 6/1921 | Sweetland | 210/346 X |
| 1,184,485 | 5/1916 | Mummert | 55/381 X |

Primary Examiner—Samih N. Zaharna
Assistant Examiner—Robert H. Spitzer
Attorney—Walter C. Kehm, Martin Smolowitz et al.

[57] ABSTRACT

An improved filter bag arrangement making use of a number of internally disposed, integrally formed filter surface media adapted to increase the effective working area of the filter bag without an associated increase in external size. Drainage members are used in a manner to co-act with such additional surface areas to provide support for the internally placed filter media as well as to convey the filtered liquid to the outlet position for exit.

12 Claims, 11 Drawing Figures

Patented Sept. 11, 1973
3,757,957
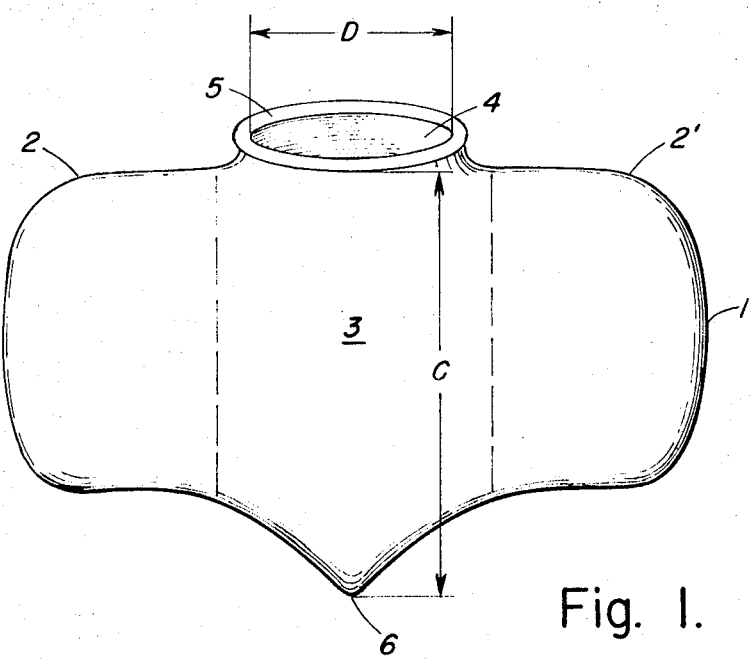
Fig. 1.
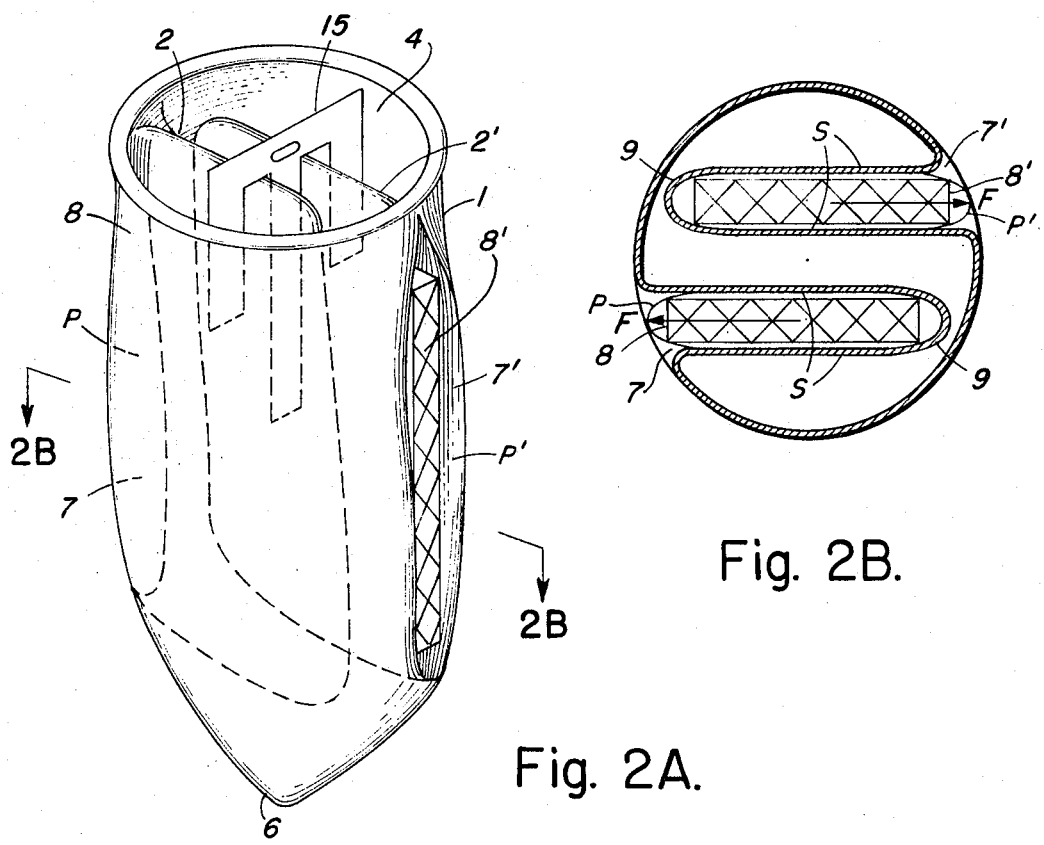
Fig. 2A.
Fig. 2B.

EXTENDED FILTER BAG

The present invention is directed to a filter bag, more particularly to an improved filter bag making use of integrally-disposed internal sections adapted to increase the effective working area of such filter bag.

It is well known that filter bags basically are constructed of a permeable material and function in a manner to entrap contaminants and let pass such materials that are to be filtered clean. It is also well known from prior art filter bags, such as those used in conjunction with the operation of vacuum cleaners, etc., to provide filter bags with a number of additional working surfaces besides the bag itself. This can be accomplished by having the bottom of the bag pushed into the center portion of such bag to have a dished or oil-canned effect.

For purposes of a clear understanding, Applicant refers to this as the inverted cone principle. As applied to filtration, the above-mentioned makes use of an elongated, generally conical filter bag having its lower end oil-canned or dish-panned. With such an arrangement, an additional filtering surface or surfaces are provided to effectively increase the working area of the bag without altering the external dimensions of the bag.

To date, very few commercial applications using this principle exist. The basic reason for this is that the filter bag must be constrained in a manner to overcome excessive compressive wall pressures brought to bear during usage. It follows that a restraining device, which is used to overcome these forces, adds to the bulk, maintenance, cost and efficiency of the filter bag.

Restraining devices are usually constructed of heavy gauge materials used in conjunction with support rings. The rings are usually placed in a horizontal plane throughout the inverted cone section and serve to overcome the forces tending to collapse the inverted cone. What follows is a noticeable decrease in the effective surface area in the bag because of the presence of such rings or other support members. In addition, there is a marked decrease in the ease of fluid flow through the filter bag at such areas since the rings or other support members tend to block such adjacent bag areas which they contact.

Applicant has found that difficulty arose not in utilization of the inverted cone principle or in the actual filtration operation, but rather in the practicality of constructing a restraining device which is easy to maintain, constructed or readily available materials, and producible at a reasonable cost.

Applicant has been prompted to direct his attention to combining the advantages of the inverted cone principle in conjunction with suitable restraining members in a new and novel manner to overcome the shortcomings of previous designs.

It is quite well established in fluid dynamics that with an increase in working area such as by the use of additional sections of filter media, a proportional increase in filtering capacity takes place. However, the ability to successfully achieve increased filtration capacity per unit area with a relatively efficient, easy to manufacture and modestly cost product has not been described in the prior art to date.

When the aforementioned conical principle was sought to be applied to liquid filtration applications, however, a number of problems as mentioned above occurred. Applicant suggests that not until the development of the present invention has it been possible to develop a practical and effective solution to such prior art problems.

Accordingly, it is the main object of the present invention to provide a filter bag free of the defects of the prior art.

Another object of the present invention is to provide a filter bag with increased surface area capable of overcoming the deficiencies of the prior art when using the inverted conical principle.

It is still another object of the present invention to provide a filter bag capable of accepting a higher flow rate per unit of external area when compared to the prior art bag configuration.

A further object of the present invention is to provide a filter bag with a number of sections internal to the bag having filtering media disposed in such bag in a manner to permit increased flow rates and associated increase in the filter bag itself.

Still a further object of the present invention is to provide a filter bag configuration easy to manufacture, of reasonable cost, and of an increased working area having concomitant contaminant removal capacity.

Another object of the present invention is to provide a filter bag arrangement capable of being used with a pressure vessel being suitable for in-line installations.

The present invention may be best understood by referring to the accompanying drawings in which:

FIG. 1 is a plan view of the present invention prior to the re-positioning of the elongated sections and insertion of associated drainage members.

FIG. 2a is a perspective view of the present invention in which the elongated sections have been re-positioned internally of the bag.

FIG. 2b is a cross-section of FIG. 2a including the inserted drainage members.

Figure 3A:
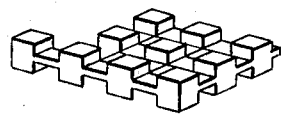
FIG. 3a is a perspective drawing of a waffle-shaped drainage member.

The main features of the present invention are directed to an improved filter bag including:

a body portion with an opening at the top to form a mouth;

a first compartment extending internally of said bag;

a second compartment extending internally of said bag disposed on the opposite side of said first compartment;

said respective compartments extending for substantially the entire length of said bag and opened at one end to receive a drainage member; said drainage member being adaptable for insertion into and removal from each of said respective compartments; and a guide member disposed through said bag mouth positioned between the upper portions of said compartments to physically separate said compartments containing drainage members, during operation of an apparatus employing said filter bag.

Also within the scope of the present invention is a filter bag including;

several substantially heart-shaped permeable members having left and right lobe portions joined together about their periphery; an open section at the top of said filter bag to form a mouth; said left and right lobe portions, respectively, adapted to be drawn through said mouth in a manner to form integrally disposed individual compartments within said bag;

said compartments extending across a substantial width of the internal cavity formed by drawing said left and right side lobe portions into said bag; and drainage members associated with each respective compartment adapted to be inserted into and in intimate contact with said compartment in a manner permitting positive fluid flow during actual operation with said bag.

According to FIG. 1, the filter bag 1 of the present invention is manufactured in a simple, elongated configuration having two side arms 2,2', a center portion 3, an opening portion 4, having an optional snap ring 5 disposed therein. The geometrical relationship of the bag is such that the side arms 2,2' and the diameter of the opening D are equal and the height of the side arms 2,2' is less than or equal to the height of the center portion of the bag C.

Figure 3C:
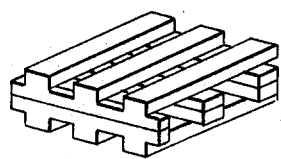
FIG. 3c is a perspective of a fluted-drainage member with internal drainage posts.
Figure 3B:
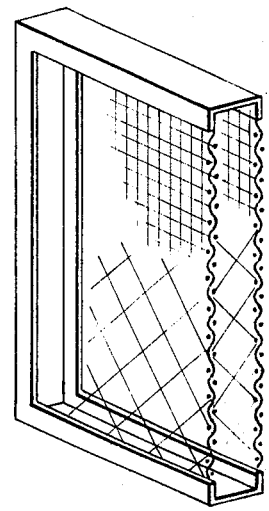
FIG. 3b is a perspective of a sandwich-type drainage member.

Once the bag is constructed, in a manner shown in FIG. 2A, the side arms 2,2' are introduced into the bag proper by drawing in an upward direction the lowermost portion 6 of the bag 1 through the opening 4. As this is done, the side arms 2,2' as a matter of course (by drawing inwardly toward the center of the bag) orient themselves to form the resultant configuration shown in FIG. 2A. It will be noticed that the bag has two pocket recesses or compartments 7,7' (looking in from the outside and in cross-sectional FIG. 2b). These two compartments or working surfaces are shown disposed integrally and internally of the bag 1. Drainage members 8,8' are then inserted into the compartments 7,7' in the bag 1. These drainage members convey the clean liquid to discharge points P,P' and hold the additional filtering media apart one from another in a predetermined spatial relationship S (see FIG. 2b) so as to permit flow of fluid on the downside of the bag (shown by arrows F in FIG. 2b). Without such drainage members 8,8' no positive fluid flow would result, since the two additional surface areas 9,9' each having a front and rear portion, would tend to adhere to one another, thus diminishing the function of the filtering operation. The drainage members 8,8' need only be capable of transporting the filtered liquid through itself to discharge points P,P'. Obviously, the optimum drainage member would not offer any resistance to fluid flow. The drainage members 8,8' can take its form in a number of shapes shown in FIGS. 3a, 3b, and 3c including: a molded or cut block waffle type pattern, a sandwich-type construction, as well as, a fluted internal drainage type construction. The fluted drainage members are formed by a series of interlocking channels having a slot portion for internally directing fluid to a point of exit beneath the channels. Suitable, permeable materials for such drainage members can be: felt, wire screens, molded plastics, expanded metals, etc. The essential feature of any drainage member must be its ability to support the filter media surrounding it, as well as conveying the filtered liquid to the outlet position for exit.

In the instance where a restraining device, such as a strainer or a wire form is used to contain the basic shape of the outward profile of the bag (not shown) the drainage members need only to be slid into the compartments 7,7' to function. (See FIG. 2b). However, when the restrainers are not used, the filter bag can function on its own. This arrangement necessitates sealing or closing off the compartments 7,7' such that the drainage members 8,8' cannot dislodge from the bag 1.

Accordingly, such sealed portion of the bag can be made of the same filter media as the bag or of a different type of material.

The present invention has been successfully employed in the pressure vessel applications with or without restraining devices and in open systems where the filter bag is attached directly to the end of a fluid source (with or without restraining devices).

As can be readily understood, depending on the specific application, differing types of materials need be used in constructing the bag, internal members and drainage devices. Generally, it has been found that a felt bag together with felt internal members and sandwich construction drainage members have worked quite satisfactorily. However, the above is merely mentioned for illustrative purposes and there are numerous other configurations and materials capable of being satisfactorily employed with the present invention.

Figure 4A:
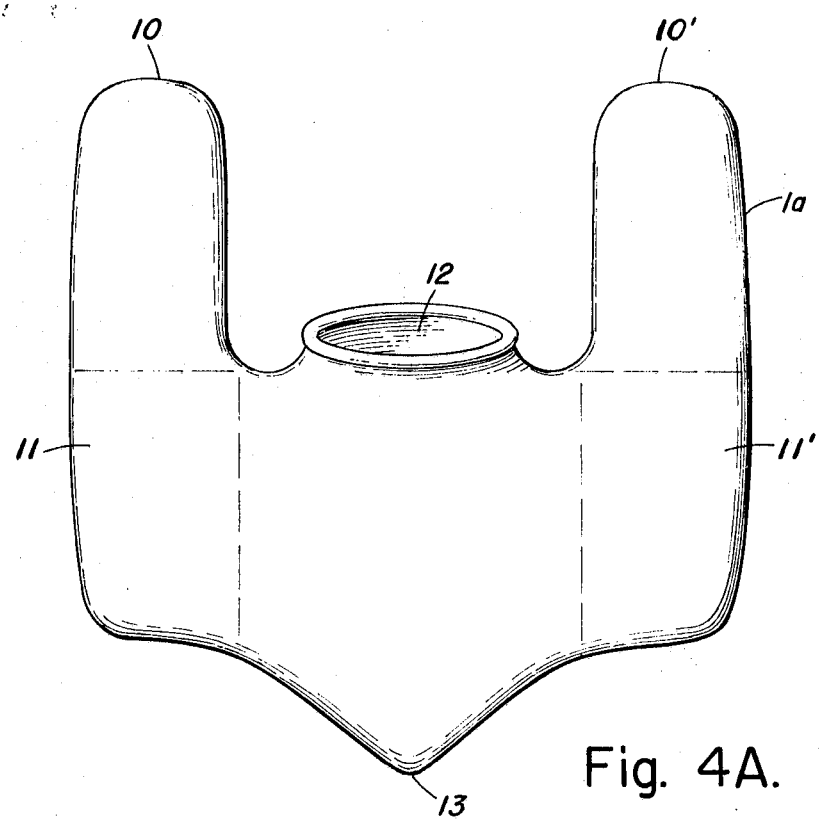
FIG. 4a is a plan view of another embodiment of the present invention.
Figure 4B:
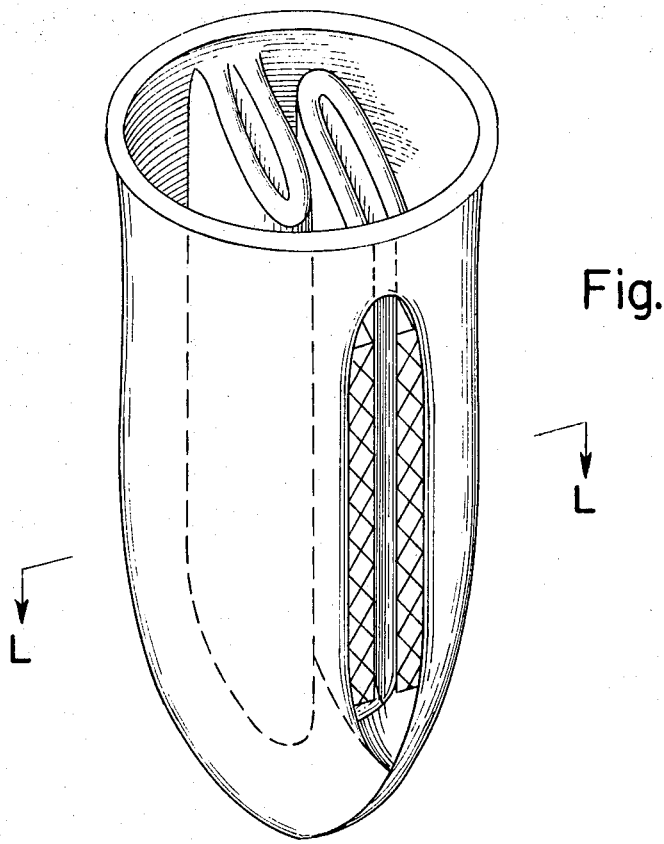
FIG. 4b is a perspective view of another embodiment of the present invention with inserted drainage members.
Figure 4C:
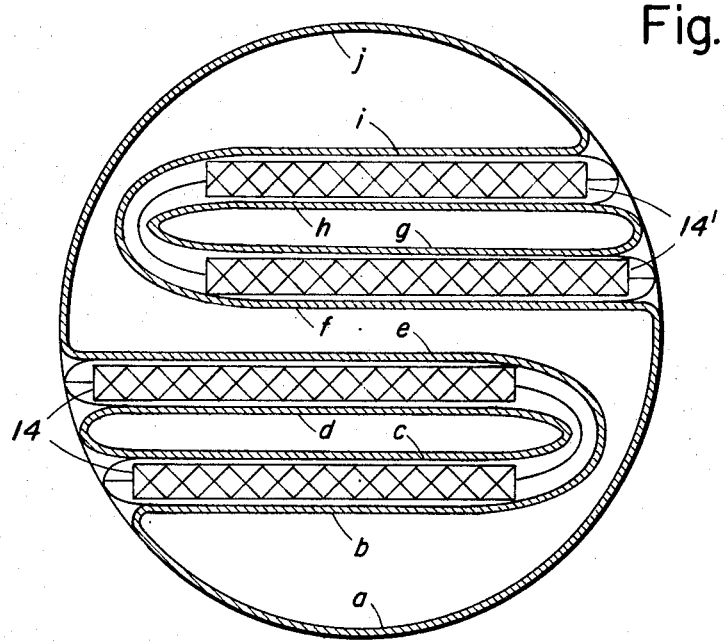
FIG. 4c is a cross-sectional view of FIG. 4b taken along the center line L—L.

Another embodiment of the present invention is shown in FIG. 4a. By means of drawing elongated members 10,10' into the hollow area 11,11' by reaching into opening 12 and by drawing 10, 10' into the area defined by 11, 11', two additional compartments are formed in the bag 1a. Thereafter, the lowermost portion 13 of the bag 1a is drawn through opening 12 i. e., by inserting one's hand into opening 12 and drawing point 13, to create a configuration having ten distinct integrally formed working surface areas—a, b, c, d, e, f, g, h, i, j (shown in FIG. 4c). As described above, individual drainage members 14 (four in this instance) are disposed in the respective compartments and function in a manner similar to that previously explained.

It is quite apparent that the internal configuration of the filter bag can be varied in accordance with specific operating requirements without sacrifice of external bag size.

With the present invention, it has been possible to provide for higher flow rates per unit external area through the use of additional sections of filtering media disposed internal of the bag.

For example, it has been found that: for a given flow rate, an increase of twofold internal surface area can result in a threefold increase in filter bag life. Also by doubling the internal area a commensurate doubling in flow rate as well as contaminant removal can occur.

Figure 5A:
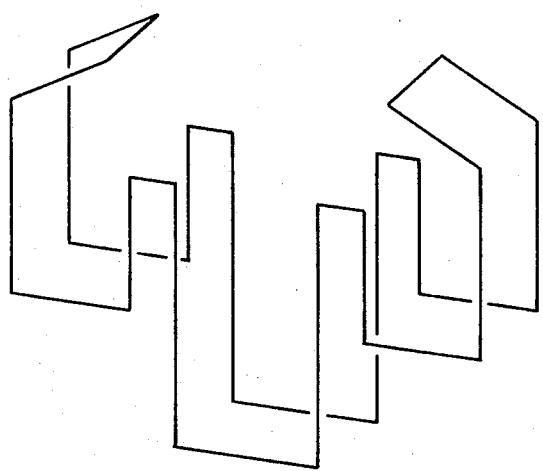
FIG. 5a is a perspective view of a simple wire form separation used in the present invention.
Figure 5B:
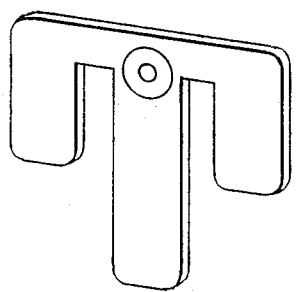
FIG. 5b is a perspective view of a separation form made in a solid form.

Applicant has used separator members such as shown in FIGS. 5a and 5b to maintain the spatial relationships between compartments during actual usage of the bag. The embodiments shown in the accompanying Figures obviously can be varied to suit the particular needs. As shown in FIG. 2a, separator member 15 is placed across the top portion of respective compartments 2,2' through opening 4. However, for efficient operation, it is desirable to maintain a minimum of surface contact between the separator 15 and the respective compartments.

In all embodiments described above, the bag, together with the additional filtering surfaces within the bag are performing work by means of a positive fluid flow in the bag sufficient to enable the entrapment of contaminants. The concept of the present invention is readily distinguishable from certain commercially known products such as the double-walled tea bags, in that, where no positive work is being accomplished by the tea bags. Furthermore, with the present invention, the drainage members in the bags are readily removable and once the bag has been used and is no longer efficiently removing contaminants from the fluid flow, such bag is disposable while the drainage members can be removed and cleaned for further use with a fresh bag.

It will be apparent to those skilled in the art from the preceding description, that certain changes may be made in the above apparatus without departing from the scope of the invention. It is intended that the descriptive matter above shall be interpreted as illustrative and in no way limiting, since all equivalents within the scope of the disclosure may be substituted and such substitution is intended.

I claim:

1. An improved filter bag including: a body portion with an opening at the top to form a mouth:
   a first compartment integral with and formed internal of said bag;
   a second compartment integral with and formed internally said bag disposed on the opposite side of said first compartment;
   said respective compartments extending for substantially the entire length of said bag and opened at one end; a drainage member, being disposed in each of said respective compartments;
   and a guide member disposed through said bag mouth positioned between the upper portions of said compartments to physically separate said compartments containing drainage members, during operation of an apparatus employing said filter bag.

2. A filter bag as claimed in claim 1, wherein; said compartments are formed integrally as part of said filter bag body portion, in parallel spatial relationship with one another to effectively provide added filtering surfaces in said bag.

3. A filter bag including;
   a plurality of substantially heart-shaped, permeable members having left and right lobe portions joined together about their periphery; an open section at the top of said filter bag to form a mouth; said left and right lobe portions, respectively, adapted to be drawn internal of said bag in a manner to form integrally disposed individual compartments within said bag;
   said compartments extending across a substantial width of the internal cavity formed by drawing said left and right side lobe portions into said bag; and
   a drainage member associated with each respective compartment adapted to be inserted into and in intimate contact therewith in a manner permitting positive fluid flow during actual operation with said bag.

4. A filter bag as claimed in claim 3, wherein: said left and right lobe portions, respectively, have associated therewith a vertically extending portion integrally formed therewith;
   said vertically extending portions being adapted to be drawn into said respective left and right side lobe portions internal of said bag to form respective first and second compartments in said lobe portions;
   said compartments extending for substantially the length of said first and second lobe portions, and drainage members disposed in said first and second compartments.

5. A filter bag as claimed in claim 1, having elongated side portions adapted to form pockets within said filter bag, wherein additional filtering surfaces integral with said bag are formed, said elongated portions being of a width equal to or less than said filter bag diameter and of a height of equal to or less than the height of the centermost portion of said filter bag.

6. A filter bag as claimed in claims 1 including: a drainage member constructed of a porous felt media.

7. A filter bag as claimed in claims 1 including: a drainage member made of a molded plastic material having a waffle configuration.

8. A filter bag as claimed in claims 1 including: a drainage member formed by a series of interlocking channels having a slot portion for internally directing fluid to a point of exit beneath said channels.

9. A filter bag as claimed in claims 1 including a drainage member formed by a series of wire mesh screens disposed in a sandwich formation.

10. A filter bag as claimed in claims 1 including a drainage member formed by sandwiching an expending metal member between a pair of wire mesh screens.

11. A filter bag as claimed in claims 1 in which: said compartments are completely permeably sealed.

12. A method of forming a filter bag with increased filtering areas including the steps of:
   joining two substantially heart-shaped permeable sections having left and right side portions to form a bag with an opening at the upper section to form a discreet mouth;
   drawing said left side and right side portions into the interior of said bag in a manner to form a plurality of integrally lodged compartments within said bag having openings at the sides of said bag;
   placing into each of said compartments a drainage member adapted to extend substantially into said compartments; and
   inserting a guide member through said mouth opening onto the upper portion of said compartments containing said drainage members to thereby control the spatial relationship therebetween.

* * * * *